Aug. 15, 1950    R. B. DOME    2,519,030
MIXER CIRCUIT
Filed Oct. 29, 1946
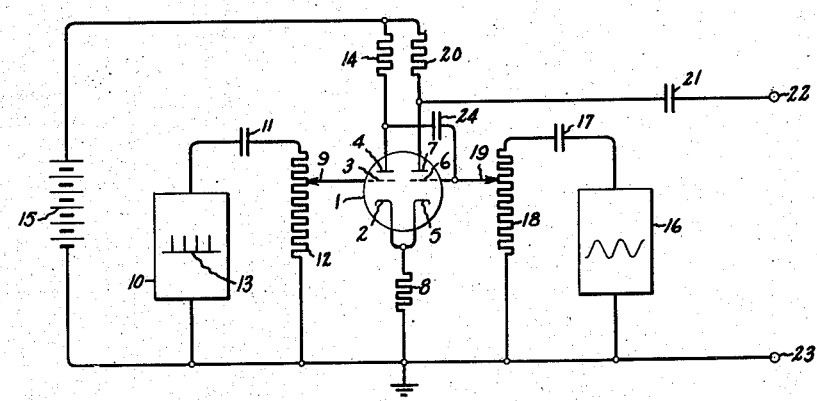
Inventor:
Robert B. Dome,
by Merton D Morse
His Attorney.

Patented Aug. 15, 1950

2,519,030

UNITED STATES PATENT OFFICE 2,519,030

MIXER CIRCUIT

Robert B. Dome, Bridgeport, Conn., assignor to General Electric Company, a corporation of New York Application October 29, 1946, Serial No. 706,447

3 Claims. (Cl. 250—27)

My invention relates to electronic tube circuits for arithmetically combining two distinct high frequency signals, and has for its primary object to provide a new and improved electronic tube circuit for mixing two signals in which the intensity of the signals may be varied independently.

In high frequency apparatus of the type employed for locating objects in space, it is customary to employ a cathode ray tube, known as a plan position indicator, to which are supplied signals reflected from an object, as well as a periodic signal of relatively high frequency which is employed to indicate electronically on the cathode ray tube the azimuth angle of an antenna which receives the reflected signals. It is customary to combine the reflected and high frequency signals prior to application to a control electrode of the cathode ray tube. One circuit used for combining two such signals comprises a pair of triodes having a common cathode resistance, the reflected signal as well as the periodically repeated signal being supplied to the two control electrodes of the triodes. One of the difficulties encountered in such a circuit, however, is that, when the intensity of one of the signals supplied to a control electrode is varied in order to control the indication on the cathode ray tube, the intensity of the other signal is adversely affected, the two signals being interdependent because of the interelectrode capacitance inherent in the electronic tubes employed. Accordingly, it is another object of my invention to provide a new and improved mixer circuit having a pair of signal input circuits and a single output circuit in which the amplitude of one input signal may be varied without affecting the amplitude of the other signal in the output circuit.

It is still another object of my invention to provide a new and improved circuit for neutralizing the interelectrode capacitance in a mixer tube of the double triode type.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which the single figure represents an embodiment of my invention.

Referring to the drawing, I have indicated therein an electron discharge device 1 of the double triode type. One of the triodes comprises a cathode 2, a control electrode 3, and an anode 4. The other triode section comprises a cathode 5, a control electrode 6, and an anode 7. The cathodes 2, 5 are connected together externally of the tube 1 and are connected to ground through a common cathode resistance 8. Control electrode 3 is connected through a variable contact 9 to a first input circuit which comprises a source of signals 10 having one terminal connected to ground and the opposite terminal connected through a coupling capacitor 11 to a variable resistance or gain control potentiometer 12 of which the contact 9 forms the variable tap. The source of signals 10 may, for example, be very short pulses, such as are used in radio locating and detecting equipment for measuring the range of a reflecting object. The signals 13 are indicated as very short pulses which occur at regularly spaced intervals of time equivalent to a determinable interval in the range.

The anode 4 of the left-hand triode is connected through a resistance 14 to the positive terminal of a source of anode potential indicated as a battery 15, the negative terminal of which is connected to ground. A second source 16 of high frequency signals is coupled to the control grid 6 through a coupling capacitor 17 and a gain control potentiometer 18 having a variable tap 19 connected to control electrode 6. The signals 16 may be, for example, sinusoidal oscillations of a relatively high frequency and may be employed for electronically producing azimuthal angle marks on a cathode ray tube used as a plan position indicator in a radio detection and ranging system. The anode 7 of the right-hand triode is connected to the positive terminal of battery 15 through a plate coupling resistor 20. The combined signals in the outputs of the two triode sections are supplied through a coupling capacitor 21 to a pair of output terminals 22, 23.

In the operation of the mixer circuit described, the left-hand triode functions as a cathode follower so that signals from the source 10 appear across cathode resistor 8 and are controllable in magnitude by varying the position of tap 9 on gain control potentiometer 12. Since the cathode resistor 8 is common to the input circuits of both triodes, variations in voltage across resistor 8 are included in the input circuit of the right-hand triode and, hence, act to control the plate current of the right-hand triode so that signals from the source 10 appear across the resistor 20 and at the output terminal 22. The right-hand triode functions also as a conventional amplifier to amplify signals from the source 16 in the usual manner.

Although the signals from both the sources 10, 16 appear across the output terminals 22, 23 and either may be controlled in amplitude by variation of respective taps 9 and 19, there is present an undesirable interlocking of the gain control action. For example, if the gain control for the right-hand triode is varied, the amplitude of signals coming from source 10 is likewise varied as measured between the output terminals. This is by virtue of the fact that, because of the interelectrode capacitance between cathode 5 and control electrode 6, the potential of the control electrode 6 does not stay at zero but varies with the variation of potential of cathode 2, that is, if the potential of cathode 2, and consequently cathode 5, is decreased by decreasing the intensity of the signals from source 10 supplied to control electrode 3, the potential of grid 6 likewise decreases. The result is that the effective grid-to-cathode potential of the right-hand triode is decreased so that the intensity of the signals of the frequency of the source 16 across the terminals 22, 23 is decreased.

In order to eliminate such undesirable interdependency of gain control action of the two triodes and to permit, so far as possible, the varying of the intensity of the two signal sources independently, I provide means for neutralizing the effects of the undesired capacity coupling between the electrodes of the right-hand triode of tube 1. This means comprises a capacitance 24 which is connected between anode 4 and control electrode 6. Insofar as normal amplification is concerned, the circuit with the addition of capacitance 24 operates as explained above. In addition, however, by suitably choosing the values of resistor 14 and capacitance 24, any action of cathode 5 tending to charge the control electrode 6 in one polarity is exactly counterbalanced by an opposite polarity charging effect through capacitance 24. As a result, the net charge on the control electrode 6 is unvaried by any variation of the intensity of signals applied to control electrode 3 so that the ratio of the voltages of the two sources across the terminals 22, 23 is independent of the impedance between control electrode 6 and ground. Hence, changing the resistance between tap 19 and ground does not affect the amplitude of the signals 13 which appear across the terminals 22, 23. In this circuit, the resistor 14 in the anode circuit of the left-hand triode functions to provide a source of potential varying with the variations of the signals of source 10 and with opposite polarity to neutralize the effect of the above described interelectrode capacitance. In constructing a circuit of this type, the values of the impedance elements 14, 24 vary inversely, that is, for a larger value of resistance 14, a smaller value of capacitance 24 is required to effect a desired neutralization.

One of the advantages of my improved mixer circuit is that it permits variation of the intensity of one of a pair of signals supplied to a mixer independently of the gain of the other signal in the mixer circuit. At the same time, my improved circuit has substantially no loading effect on signals from either of the sources; that is, signals from source 10 do not appear at source 16 as undesirable cross-talk.

While in the drawing and foregoing description I have described the two triodes as being enclosed in a single envelope, it is of course apparent that separate envelopes may be provided for the two triodes and the grid-to-cathode capacitance of one of the triodes neutralized in the manner described and illustrated.

While I have shown a particular embodiment of my invention, it will of course be understood that I do not wish to be limited thereto since different modifications may be made both in the circuit arrangements and the instrumentalities employed and I contemplate by the appended claims to cover all such modifications as fall within the true spirit and scope of my invention.

What I claim as new and desire to secure by Letters Patent of the United States is:

1. In combination, a mixer comprising a pair of electron discharge devices, each comprising an anode, a cathode, and a control electrode, said cathodes being connected through a common resistance to a point of fixed potential, a pair of sources of signals of variable intensity connected respectively between said point and respective ones of said control electrodes, whereby undesired capacitance between one of said control electrodes and its associated cathode causes a potential of said one electrode to vary undesirably with variation in the intensity of signals supplied to the other of said control electrodes, and means comprising a capacitance connected between said one electrode and the anode associated with said other electrode for neutralizing said undesired capacitance.

2. In combination, a mixer comprising a pair of electron discharge devices, each comprising an anode, a cathode, and a control electrode, a source of potential having positive and negative terminals, said cathodes being connected through a common resistance to said negative terminal, a pair of sources of signals connected respectively between said negative terminal and respective ones of said control electrodes, means for varying independently the intensity of signals supplied to said respective electrodes, undesired capacitance coupling between one of said control electrodes and its associated cathode causing the potential of said one electrode to vary undesirably with variations in intensity of signals supplied to the other of said control electrodes, means for producing signals varying oppositely to the signals supplied to said other electrode, and means utilizing said oppositely varying signals for neutralizing the effect of said undesired capacitance.

3. In combination, a mixer comprising a pair of electron discharge devices, each comprising an anode, a cathode, and a control electrode, a source of potential having positive and negative terminals, said cathodes being connected through a common resistance to said negative terminal, said anodes being connected through respective resistances to said positive terminal, a pair of sources of signals of variable intensity connected respectively between said negative terminal and respective ones of said control electrodes, undesired capacity coupling between one of said control electrodes and its associated cathode causing the potential of said one electrode to vary undesirably with variation in the signals supplied to the other of said control electrodes, and means comprising a capacitance connected between said one electrode and the anode associated with the other electrode for neutralizing said undesired capacitance.

ROBERT B. DOME.

REFERENCES CITED

The following references are of record in the file of this patent:

UNITED STATES PATENTS

| Number | Name | Date |
|---|---|---|
| 2,265,996 | Blumlein | Dec. 16, 1941 |
| 2,441,954 | Chatterjea | May 25, 1948 |